United States Patent
Gaurav et al.

(10) Patent No.: US 10,977,071 B2
(45) Date of Patent: Apr. 13, 2021

(54) SYSTEM AND METHOD FOR VM CLONING IN A SOFTWARE DEFINED STORAGE ENVIRONMENT

(71) Applicant: Nutanix, Inc., San Jose, CA (US)

(72) Inventors: Ramashish Gaurav, Bangalore (IN); Anupam Chakraborty, Bangalore (IN); Raghu Rapole, Telangana (IN)

(73) Assignee: Nutanix, Inc., San Jose, CA (US)

( * ) Notice: Subject to any disclaimer, the term of this patent is extended or adjusted under 35 U.S.C. 154(b) by 69 days.

(21) Appl. No.: 16/380,960

(22) Filed: Apr. 10, 2019

(65) Prior Publication Data

US 2020/0326965 A1 Oct. 15, 2020

(51) Int. Cl.
G06F 9/455 (2018.01)

(52) U.S. Cl.
CPC .......... *G06F 9/45558* (2013.01); *G06F 2009/45562* (2013.01)

(58) Field of Classification Search
CPC ................................. G06F 9/45558
USPC .......................................... 718/1
See application file for complete search history.

(56) References Cited

U.S. PATENT DOCUMENTS

| | | | |
|---|---|---|---|
| 7,725,671 B2 | 5/2010 | Prahlad et al. | |
| 7,840,533 B2 | 11/2010 | Prahlad et al. | |
| 8,447,728 B2 | 5/2013 | Prahlad et al. | |
| 8,549,518 B1 | 10/2013 | Aron et al. | |
| 8,601,473 B1 | 12/2013 | Aron et al. | |
| 8,762,335 B2 | 6/2014 | Prahlad et al. | |
| 8,832,352 B2* | 9/2014 | Tsirkin | B61D 17/06 |
| | | | 105/403 |
| 8,850,130 B1 | 9/2014 | Aron et al. | |
| 9,189,342 B1* | 11/2015 | von Thenen | G06F 9/455 |
| 9,477,507 B2* | 10/2016 | Li | G06F 9/45558 |
| 9,740,723 B2 | 8/2017 | Prahlad et al. | |
| 9,772,866 B1 | 9/2017 | Aron et al. | |
| 10,210,048 B2 | 2/2019 | Sancheti | |
| 10,248,657 B2 | 4/2019 | Prahlad et al. | |
| 10,310,872 B2* | 6/2019 | Tsirkin | G06F 9/4843 |
| 10,445,126 B2* | 10/2019 | Tsirkin | G06F 9/445 |
| 10,613,708 B2* | 4/2020 | Asayag | G06F 9/45533 |
| 2015/0074054 A1* | 3/2015 | Antony | G06F 16/128 |
| | | | 707/639 |
| 2015/0178108 A1* | 6/2015 | Tarasuk-Levin | G06F 9/45558 |
| | | | 718/1 |

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Evral E Bodden
(74) *Attorney, Agent, or Firm* — Foley & Lardner LLP

(57) ABSTRACT

An illustrative embodiment disclosed herein is a method including receiving, by a controller virtual machine (CVM) and from a hypervisor, a request to clone a virtual machine (VM) state. The VM state includes a parent state and a snapshot. The method further includes cloning, by the CVM, the parent state and the snapshot to generate a cloned parent state and a cloned snapshot, respectively, and sending, by the CVM and to the hypervisor, data indicating successful cloning of the parent state and the snapshot.

20 Claims, 5 Drawing Sheets

(56) References Cited

OTHER PUBLICATIONS https://docs.microsoft.com/en-us/powershell/module/hyper-v/import-vm?view=win10-ps, (downloaded on Mar. 1, 2019).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Web article entitled "https_docs_microsoft_com_en-us_powershell_module_hyper-v_export-vm_view_win10-ps", (downloaded on Mar. 1, 2019).

* cited by examiner

SYSTEM AND METHOD FOR VM CLONING IN A SOFTWARE DEFINED STORAGE ENVIRONMENT

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to a system and method for VM cloning in a software defined storage environment.

An illustrative embodiment disclosed herein is a method including receiving, by a controller virtual machine (CVM) and from a hypervisor, a request to clone a virtual machine (VM) state. The VM state includes a parent state and a snapshot. The method further includes cloning, by the CVM, the parent state and the snapshot to generate a cloned parent state and a cloned snapshot, respectively, and sending, by the CVM and to the hypervisor, data indicating successful cloning of the parent state and the snapshot.

Another illustrative embodiment disclosed herein is an apparatus including a processor having programmed instructions to receive a request to clone a virtual machine (VM) state. The VM state includes a parent state and a snapshot. The processor has further programmed instructions to clone the parent state and the snapshot to generate a cloned parent state and a cloned snapshot, respectively, and send data indicating successful cloning of the parent state and the snapshot.

Another illustrative embodiment disclosed herein is a non-transitory computer readable storage medium to store a computer program configured to execute a method including receiving a request to clone a virtual machine (VM) state. The VM state includes a parent state and a snapshot. The method further includes cloning the parent state and the snapshot to generate a cloned parent state and a cloned snapshot, respectively, and sending data indicating successful cloning of the parent state and the snapshot.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
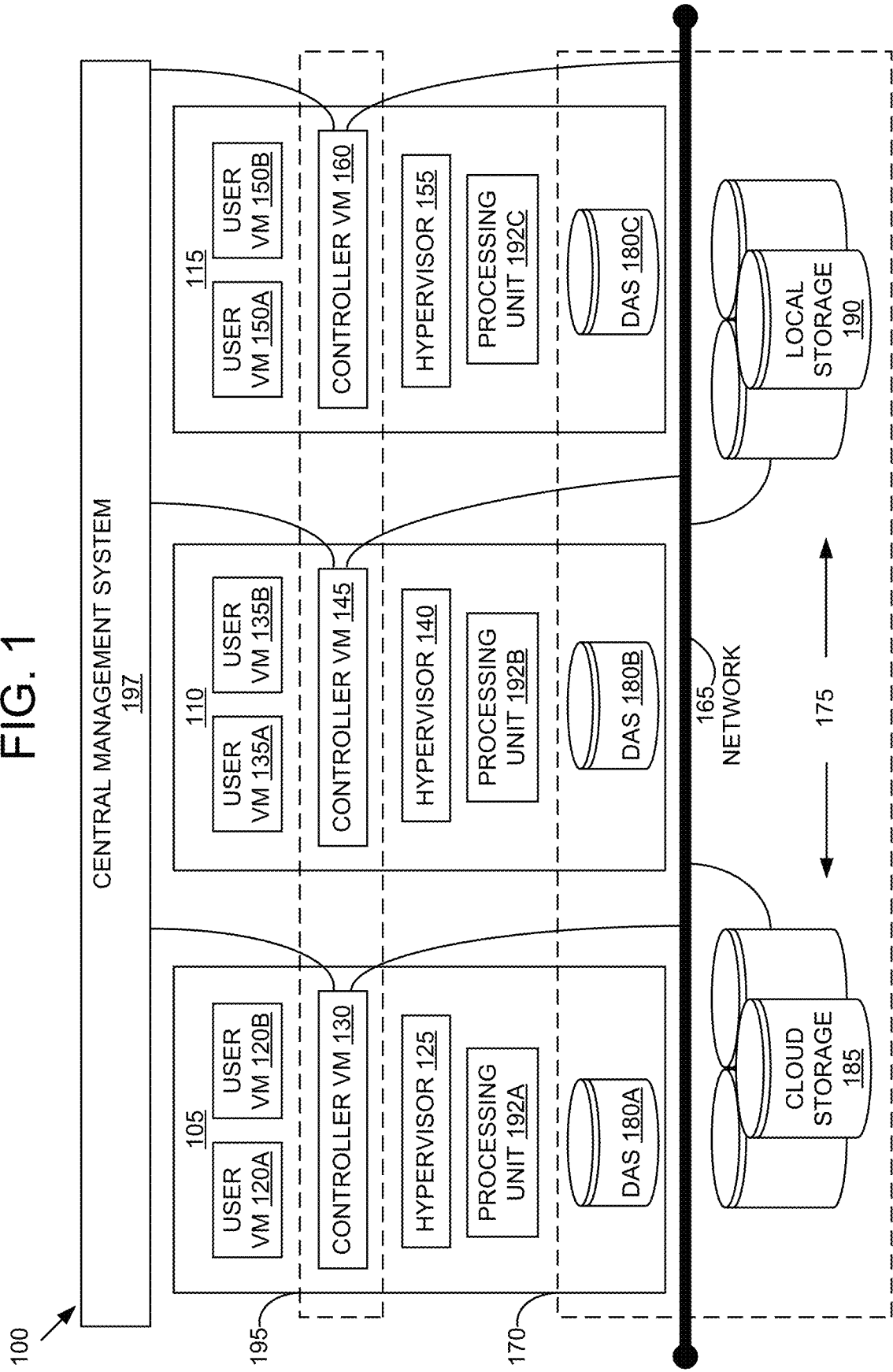
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In a distributed, software defined storage environment, storage is facilitated by virtual disks and the virtual disk blocks are spanned across multiple nodes. Each source VM can have multiple snapshots including differencing virtual disks and configuration files to capture the state of the VM at a point of time of the snapshot. The number of files copied for a VM to clone is proportional to the number of snapshots of the VM. Copying in the convention systems herein refers to creating a complete duplicate of the virtual disk. The differencing virtual disks can grow up to the size of the parent virtual hard disk. In conventional systems and methods, a hypervisor copies each of the differencing virtual disks and configuration files of the VM. Thus, copying a VM, including the snapshots, from a hypervisor can be very time consuming operation and can require significant storage capacity. There is a need for a system and method for cloning VMs in a software defined storage environment that is less time consuming and requires less storage capacity, while simultaneously preserving snapshots of the VM during the cloning process. There is also a need for the system and method to be hypervisor agnostic.

The present disclosure includes one or more embodiments of a distributed, software defined storage environment wherein a controller virtual machine (CVM) creates software shadow copies of the virtual disks, the associated snapshots, and associated files including configuration files. Shadow copying, by the CVM, herein refers to adding a reference to each of the virtual disks. Once the CVM creates the shadow copies, the paths of the configuration files can be modified and a virtual machine corresponding to the configuration files can be registered using the hypervisor provided APIs to create clone of a VM. Because shadow copying requires less time and storage space than creating a complete duplicate of the virtual disks, the one or more embodiments of the present disclosure clones the VM, while preserving the snapshots of the VM, at a faster rate and reduces the required storage space. Because copying is done at the CVM, the one or more embodiments of the present disclosure is hypervisor agnostic. The present disclosure enables the hypervisor to create a VM clone on a software defined storage where the underlying storage can come from commodity hardware of different vendor. The underlying storage can be solid state device (SSD), serial advanced technology attachment (SATA) and combination of them.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

VM Cloning in a Software Defined Storage Environment

Figure 2:
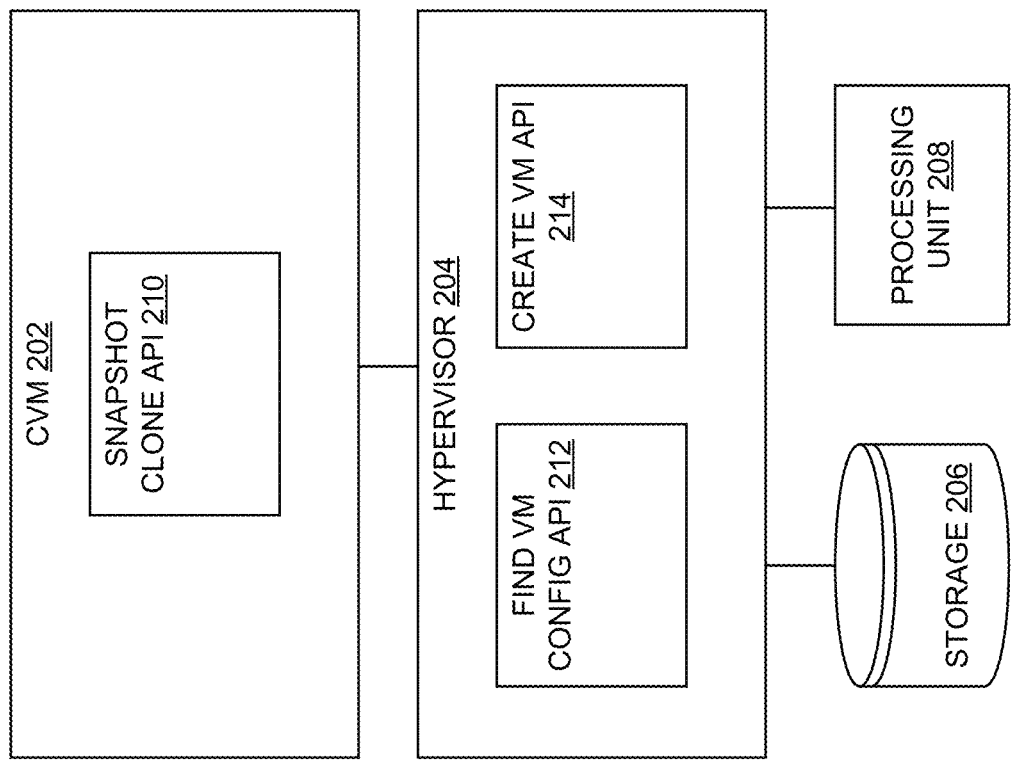
FIG. 2 is an example block diagram of a node for VM cloning in a software defined storage environment, in accordance with some embodiments of the present disclosure.

Referring now to FIG. 2, an example embodiment of a node 200 for VM cloning in a software defined storage environment is shown. The node 200 be implemented as a part of the virtual computing system 100, which is detailed herein with respect to FIG. 1. In brief overview, the node 200 includes a controller virtual machine (CVM) 202, a hypervisor 204, a storage 206 and a processing unit 208. The hypervisor 204 is coupled to the CVM 202, the storage 206, and the processing unit 208. The CVM 202 may include a snapshot clone application programming interface (API) 210. The hypervisor 204 may include a find VM config API 212 and a create VM API 214. The CVM 202, the hypervisor 204, the storage 206, and the processing unit 208 may be collectively referred to herein as components of FIG. 2. The snapshot clone API 210, the find VM config API 212, and the create VM API 214 may be collectively referred to herein as sub-components of FIG. 2.

The CVM 202 may be configured to clone a VM, such as the user VM 120A, including all states of the VM depicted with respect to FIG. 1. The CVM 202 and the VM are understood to be operating in a software defined storage environment. In some embodiments, cloning is performed by shadow copying, which adds a reference to one or more virtual disk associated with the VM. The one or more virtual disks may include one or more states and/or files belonging to the VM. In some embodiments, adding a reference to the one or more virtual disks includes adding a reference to each of the one or more virtual disks. In some embodiments, adding a reference to the one or more virtual disks includes adding a reference for each of the one or more states and/or files belonging to the VM. Cloning the states may include generating one or more cloned states. The states may include a parent state and snapshots. The one or more cloned states may include a cloned parent state and a cloned snapshot. Each of the states may have one or more configuration files and one or more data files. The VM and/or each of the states of the VM may have attributes such as a universally unique identifier (UUID), a path in a file directory associated with the storage 206, a parent-child relationship with other states, and the like. The CVM 202 may be configured to clone the parent state of the VM. The parent state may have been created at a time when the VM was created. The CVM 202 may be configured to clone some or all of one or more snapshots of the VM. Each of the one or more snapshots may have been created at some point after the parent state has been created. The parent state and/or the snapshot may have an indication of the parent-child relationship between the parent state and the snapshot. For example, one of the files of the parent state may point at one of the files of the snapshot. The one or more cloned states may have an indication that the cloned state is a child of a state from which it is cloned. The CVM 202 may be configured to detect states in addition to the parent state by identifying all of the pointers from the parent state to the snapshots. In some embodiments, the CVM 202 may be configured to clone each of the states by causing the processing unit 208 to execute instructions of the snapshot clone API 210.

The hypervisor 204 may be configured to find a VM configuration of the VM. The VM configuration may include all of the states including all of the data files and the configuration files of the VM. In some embodiments, the hypervisor 204 may be configured to clone each of the states by causing the processing unit 208 to execute instructions of the find VM config API 212. The hypervisor 204 may be configured to send a request to the CVM 202 to clone the states of the VM. The request may include an indication of the VM configuration, such as a location of a configuration file. The hypervisor 204 may be configured to modify the attributes of the cloned VM states. In some embodiments, the hypervisor 204 is configured to modify the parent-child relationship involving at least one of the cloned states. For example, the hypervisor 204 may remove an indication that the cloned snapshot is a child of the snapshot and may generate an indication that the cloned snapshot is a child of the cloned parent. In some embodiments, the hypervisor 204 is configured to modify the UUID or the path of the cloned VM states. The hypervisor 204 may be configured to register a new VM including the cloned VM states. In some embodiments, a second hypervisor may register the new VM. In some such embodiments, the hypervisor 204 and the second hypervisor may be hypervisors of different vendors. In some embodiments, the hypervisor 204 may be configured to modify the cloned states and register a new VM by causing the processing unit 208 to execute instructions of the create VM API 214.

The node 200 may be an instance of the node 105 with respect to FIG. 1. The CVM 202 may be an instance of the controller VM 130 with respect to FIG. 1. The hypervisor 204 may be an instance of the hypervisor 125 with respect to FIG. 1. The storage 206 may be an instance of the DAS 180A with respect to FIG. 1. The storage 206 may include one or more virtual disks for access by VMs managed by the CVM 202. The processing unit 208 may be an instance of the processing unit 192A with respect to FIG. 1.

Although one of each of the components and sub-components is shown in the node 200, in other embodiments, greater than one of some or all of the components and/or sub-components may be used in the node 200. In some embodiments, some of the components of FIG. 2 may reside in different nodes similar to the node 200. For example, the CVM 202 may reside on a first node different than a second node on which the storage 206 resides. In some embodiments, some of the components of FIG. 2 may reside across multiple nodes similar to the node 200. In some such embodiments, the storage 206 may be an instance of the storage pool 170, the NAS 175, the cloud storage 185, or the local storage 190 with respect to FIG. 1.

Each of the components of the virtual computing system 100 and the node 200 is implemented using hardware or a combination of hardware or software, in one or more embodiments. For instance, each of these elements or entities can include any application, program, library, script, task, service, process or any type and form of executable instructions executing on hardware of the virtual computing system 100 and/or the node 200. The hardware includes circuitry such as one or more processors (e.g. the processing unit 208) in one or more embodiments. Each of the one or more processors is hardware. In some embodiments, multiple components (e.g. the CVM 202 and the hypervisor 204) have instructions that are executed by the processing unit 208. In some embodiments, the instructions of some of the components have their own corresponding processing units similar to the processing unit 208 on which the respective instructions are executed (e.g. the CVM 202 executes instructions on a first processing unit and the hypervisor 204 executes instructions on a second processing unit).

Figure 3:
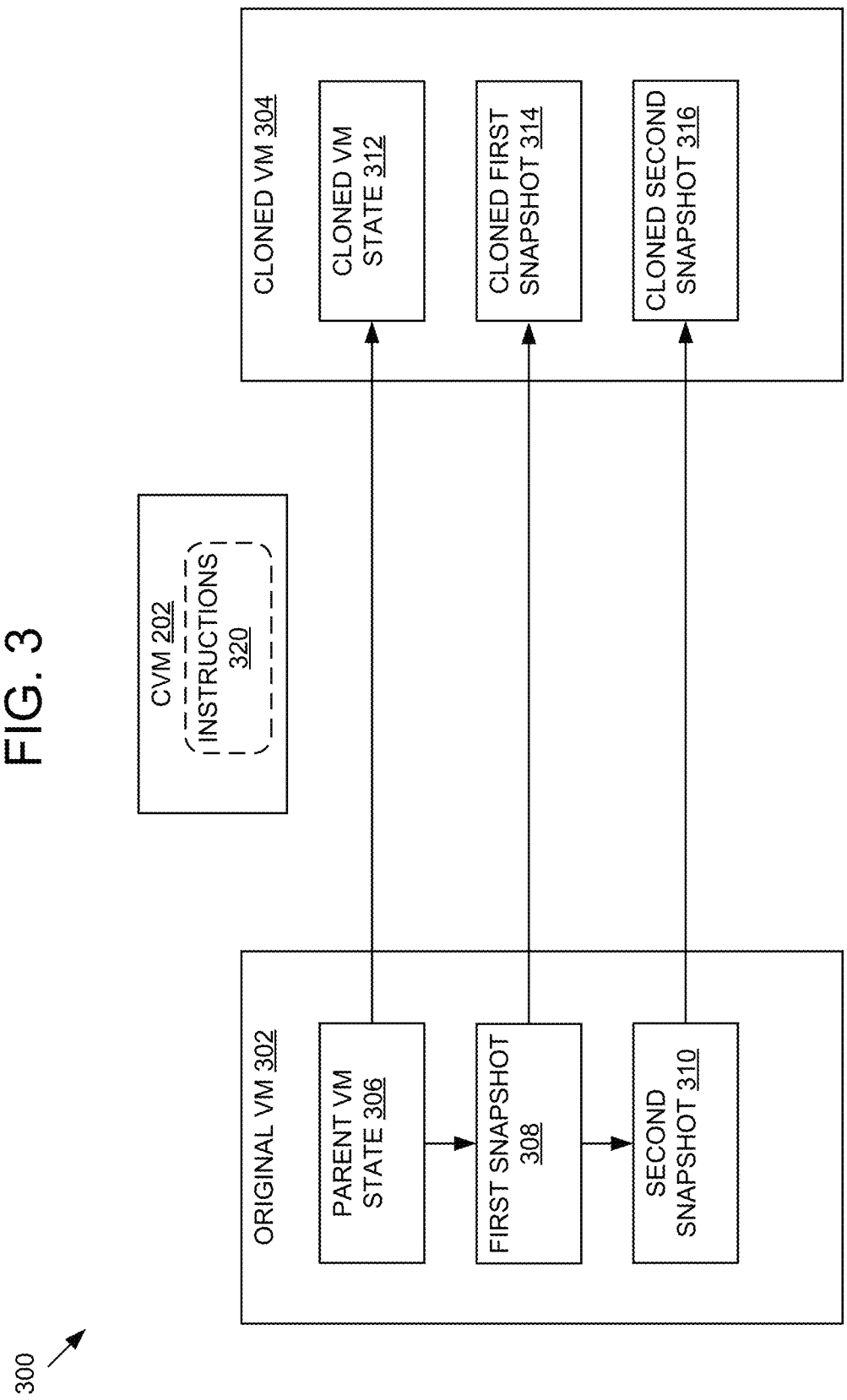
FIG. 3 is an example block diagram for cloning VM states, in accordance with some embodiments of the present disclosure.

Referring now to FIG. 3, an example environment 300 for cloning VM states is shown. The environment 300 may be implemented as a part of the virtual computing system 100 and/or the node 200, both of which are detailed herein with respect to FIG. 1 and FIG. 2. In brief overview, the environment 300 includes the CVM 202, an original VM 302, and a cloned VM 304. The original VM 302 includes a parent VM state 306, a first snapshot 308, and a second snapshot 310. The parent VM state 306, the first snapshot 308, and the second snapshot 310 may be collectively referred to herein as original states. The cloned VM 304 includes a cloned VM state 312, a cloned first snapshot 314, and a cloned second snapshot 316. The cloned VM state 312, the cloned first snapshot 314, and the cloned second snapshot 316 may be collectively referred to herein as cloned states.

The CVM 202 may be configured to clone the original states by generating the cloned states. In some embodiments, the CVM 202 has instructions 320 that, when executed by a processing unit, such as the processing unit 208 (not shown here), causes the original states to be cloned into cloned states. The instructions 320 may be stored in a memory of the CVM 202. The memory may be virtualized memory that is transformed by a hypervisor, such as the hypervisor 204, from hardware memory in a storage, such as the storage 206. In some embodiments, the instructions 320 are stored in a non-transitory storage medium in the storage 206. In some embodiments, the processing unit 208 has access to the memory and/or the non-transitory storage medium in the storage 206.

The parent VM state 306 may point to the first snapshot 308 to indicate a parent-child relationship, with the parent VM state 306 being the parent and the first snapshot 308 being the child. The first snapshot 308 may point to the second snapshot 310. In some embodiments not shown here, the parent VM state 306 may point to the first snapshot 308 and the second snapshot 310 rather than the embodiment shown. Subsequent to cloning, the parent VM state 306 may point to the cloned VM state 312, the first snapshot 308 may point to the cloned first snapshot 314, and the second snapshot 310 may point to the cloned second snapshot 316. In order to complete the cloning process, a component such as the CVM 202 or the hypervisor 204 may modify the pointers so that the cloned VM state 312 points to the cloned first snapshot 314 and the cloned first snapshot 314 points to the cloned second snapshot 316. The component may modify the pointers by removing some or all of the pointers between the original VM 302 and the cloned VM 304, such as the pointer from the first snapshot 308 to the cloned first snapshot 314 and the second snapshot 310 to the cloned second snapshot 316. Subsequent to cloning, a component such as the CVM 202 or the hypervisor 204 may register the cloned VM 304.

The original VM 302 and the cloned VM 304 may be instances of the user VM 120A with respect to FIG. 1. The CVM 202, the original VM 302, and the cloned VM 304 may reside on a same node such as the node 105. In some embodiments, some or all of the CVM 202, the original VM 302, and the cloned VM 304 reside on multiple different nodes similar to the node 105.

Each of the components of the environment 300 (e.g. the CVM 202, the original VM 302, and the cloned VM 304) is implemented using hardware or a combination of hardware or software, in one or more embodiments. For instance, each of these elements or entities can include any application, program, library, script, task, service, process or any type and form of executable instructions executing on hardware. The hardware includes circuitry such as one or more processors (e.g. the processing unit 208) in one or more embodiments. Each of the one or more processors is hardware. In some embodiments, multiple components (e.g. the CVM 202 and the original VM 302) have instructions that are executed by the processing unit 208. In some embodiments, the instructions of some of the components have their own corresponding processing units similar to the processing unit 208 on which the respective instructions are executed (e.g. the CVM 202 executes instructions on a first processing unit and the original VM 302 executes instructions on a second processing unit).

Figure 4:
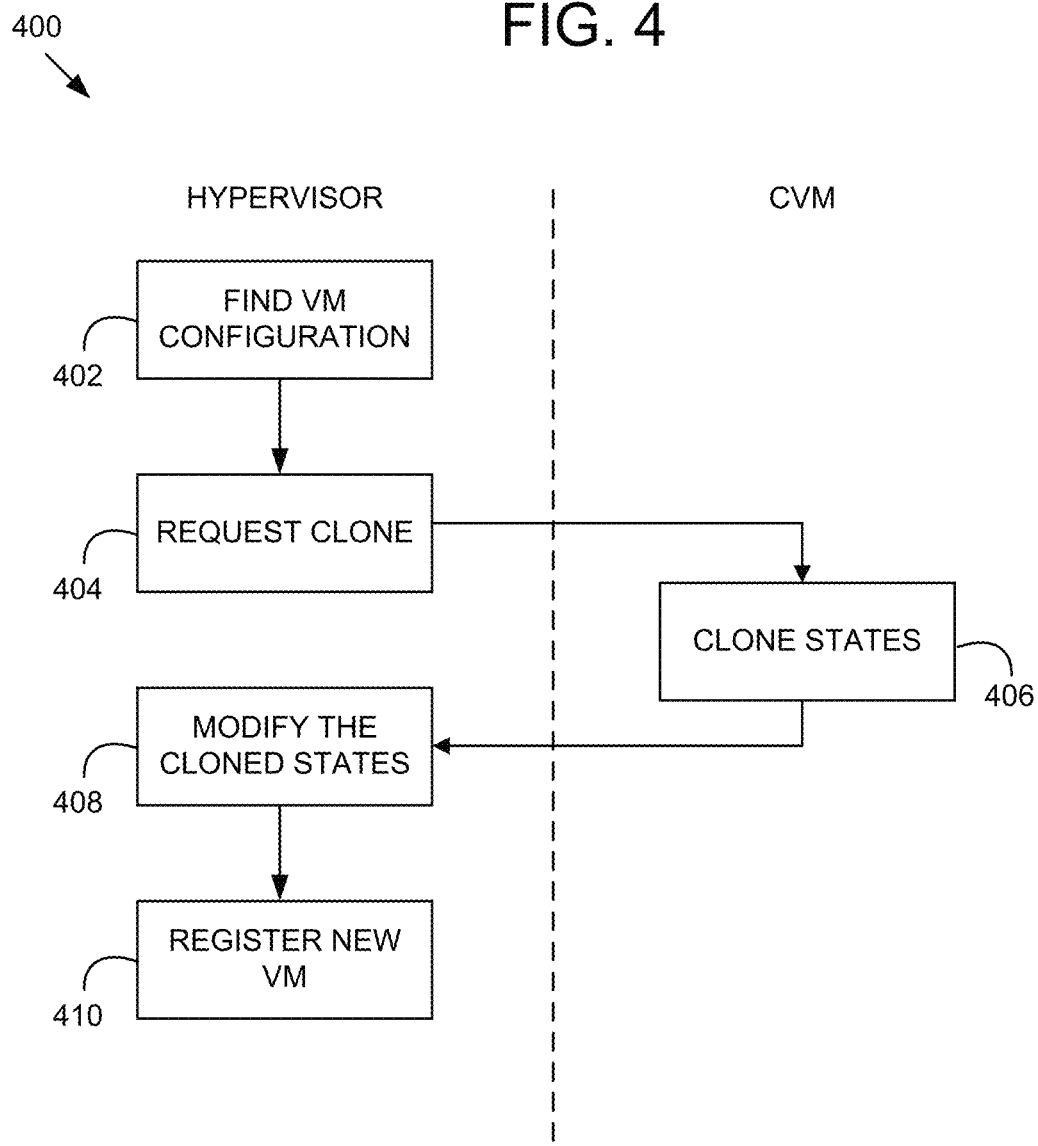
FIG. 4 is an example flow diagram for cloning a VM, in accordance with some embodiments of the present disclosure.

Referring now to FIG. 4, an example flow diagram 400 for cloning a VM is shown. The flow diagram 400 for cloning a VM may be implemented using, or performed by, the components of the node 200 or the environment 300, both of which are detailed herein with respect to FIG. 2 and FIG. 3. Additional, fewer, or different operations may be performed in the flow diagram 400 depending on the embodiment. In brief overview of the flow diagram 400, the hypervisor finds a VM configuration of a VM (402). The hypervisor sends a request to a CVM for cloning the states of the VM (404). The CVM clones the states of the VM by generating cloned states (406). The hypervisor modifies the cloned states (408). The hypervisor registers a new VM corresponding with the cloned states (410).

At operation 402, a hypervisor, such as the hypervisor 204, finds a VM configuration of a VM, such as the original VM 302. The VM configuration may include data files, configuration files, snapshots, and the like. The VM configuration may include paths of the data files, the configuration files, and the snapshots. At operation 404, the hypervisor sends a request to a CVM for cloning the states of the VM. At operation 406, a CVM, such as the CVM 202, clones the states of the VM by generating cloned states. The operation 406 will be discussed in detail with respect to FIG. 5.

At operation 408, the hypervisor modifies the cloned states. Modifying the cloned states may include modifying attributes of the cloned states. The attributes may include a UUID, a path, a parent-child relationship, and the like. The attributes may reside in a configuration file for each of the states. At operation 410, the hypervisor registers a new VM, such as the cloned VM 304, corresponding with the cloned states.

Figure 5:
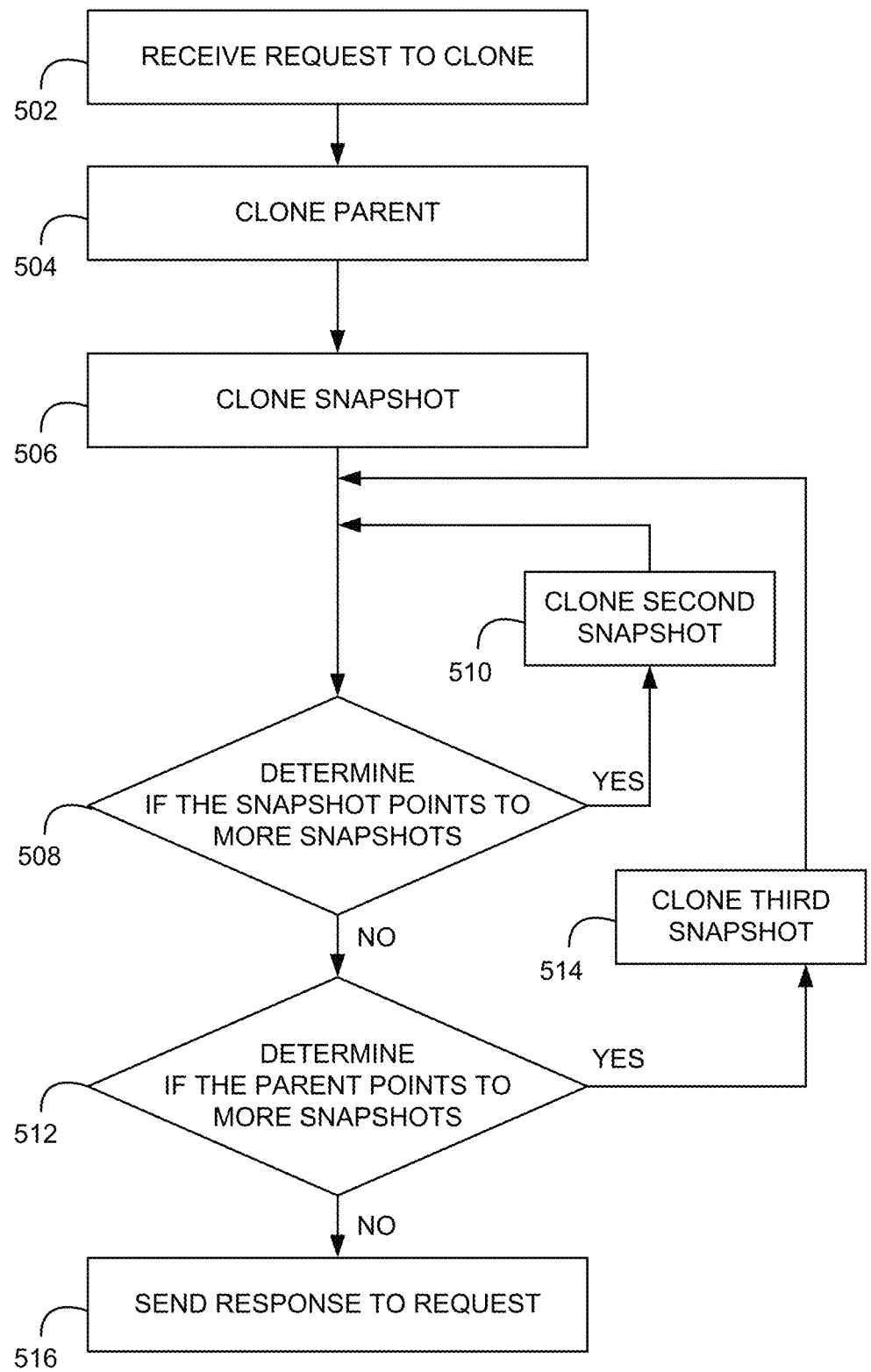
FIG. 5 is an example method for cloning VM states, in accordance with some embodiments of the present disclosure.

Referring now to FIG. 5, an example method 500 for cloning VM states is shown. The method 500 for cloning VM states may be implemented using, or performed by, the components of the node 200 or the environment 300, both of which are detailed herein with respect to FIG. 2 and FIG. 3. Additional, fewer, or different operations may be performed in the method 500 depending on the embodiment. The VM can have any number of levels of hierarchy of the states of the VM. Without loss of generality, the example method 500 depicts three levels of hierarchy in the states of the VM (e.g. a parent state pointing to a first snapshot, which points to a second snapshot). In brief overview of the method 500, the CVM receives a request to clone VM states (502). The CVM clones a parent state (504). The CVM clones a snapshot (506). The CVM determines whether the snapshot points to more snapshots (508). The CVM clones a second snapshot (510). The CVM determines whether the parent points to more snapshots (512). The CVM clones a third snapshot (514). The CVM sends a response to the request (516).

At operation 502, a CVM, such as the CVM 202, receives a request to clone VM states of a VM, such as the original VM 302. Receiving a request may include receiving an interrupt from a hypervisor, such as the hypervisor 204. Receiving a request may include polling the hypervisor at predetermined time periods.

At operation 504, the CVM clones a parent state, such as the parent VM state 306, by generating a cloned parent state, such as the cloned VM state 312. Cloning the parent state includes cloning one or more configuration files and one or more data files created at the time the VM of the parent state was created. In some embodiments, cloning the parent state includes prevent further writes from occurring on the parent state. In some such embodiments, attempts to write to the parent state may result in writes to the cloned parent state. At operation 506, the CVM clones a snapshot, such as the first snapshot 308. The operation of cloning the snapshot may be similar to cloning the parent state.

At operation 508, the CVM determines whether the snapshot points to more snapshots. Determining whether the snapshot points to more snapshots may include identifying any pointers in the snapshot that point to other snapshots. Determining whether the snapshot points to more snapshots may include identifying the more snapshots in the request sent by the hypervisor.

At operation 510, responsive to determining that the snapshot points to more snapshots, the CVM clones a second snapshot, such as the second snapshot 310, that is pointed to by the snapshot. Subsequent to the determination, the method 500 returns to operation 508. At operation 512, responsive to determining that the snapshot does not point to more snapshots, the CVM determines whether the parent state points to more snapshots. At operation 514, responsive to determining that the parent state points to more snapshots, the CVM clones a third snapshot that is pointed to by the parent state. Subsequent to the determination, the method 500 returns to operation 508 except that the subject of the operation 508 is the third snapshot.

At operation 516, responsive to determining that the parent state does not point to more snapshots, the CVM sends a response to the request. The response may include an indication of successful completion of the cloning. In some embodiments, the response includes an identifier of each of the cloned states. In some embodiments, the response includes a path of each of the cloned states. In some embodiments, the response includes a location of a pointer to each of the cloned states.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A computer-implemented method comprising:
   receiving, by a controller virtual machine (CVM) and from a hypervisor, a request to clone a virtual machine (VM) state, wherein the VM state includes a parent state and a snapshot;
   cloning, by the CVM, the parent state and the snapshot to generate a cloned parent state file and a cloned snapshot file, respectively; and
   sending, by the CVM and to the hypervisor, data indicating successful cloning of the parent state and the snapshot;
   wherein the hypervisor modifies a universally unique identifier of a configuration file for each of the cloned parent state file and the cloned snapshot file.

2. The method of claim 1, wherein the parent state includes an indication of a relationship to the snapshot.

3. The method of claim 1, further comprising:
   detecting, by the CVM, a second snapshot; and
   cloning, by the CVM, the second snapshot.

4. The method of claim 1, wherein each of the parent state and the snapshot include a configuration file and a data file.

5. The method of claim 1, wherein the hypervisor removes a first indication of a relationship between the snapshot and the cloned snapshot, and wherein the hypervisor generates a second indication of a relationship between the cloned parent state file and the cloned snapshot file.

6. The method of claim 1, wherein the hypervisor registers a cloned VM including the cloned parent state file and the cloned snapshot file.

7. An apparatus comprising a processor having programmed instructions to:
   receive a request to clone a virtual machine (VM) state, wherein the VM state includes a parent state and a snapshot;
   clone the parent state and the snapshot to generate a cloned parent state file and a cloned snapshot file, respectively; and
   send data indicating successful cloning of the parent state and the snapshot,
   wherein the hypervisor modifies a universally unique identifier of a configuration file for a configuration file for a configuration file for each of the cloned parent state file and the cloned snapshot file.

8. The apparatus of claim 7, wherein the parent state includes an indication of a relationship to the snapshot.

9. The apparatus of claim 7, the processor having further programmed instructions to:
   detect a second snapshot; and
   clone the second snapshot.

10. The apparatus of claim 7, wherein each of the parent state and the snapshot include a configuration file and a data file.

11. The apparatus of claim 7, wherein the hypervisor removes a first indication of a relationship between the snapshot and the cloned snapshot, and wherein the hypervisor generates a second indication of a relationship between the cloned parent state file and the cloned snapshot file.

12. The apparatus of claim 7, wherein the hypervisor registers a cloned VM including cloned parent state file and the cloned snapshot file.

13. A non-transitory computer readable storage medium to store a computer program configured to execute a method comprising:
    receiving a request to clone a virtual machine (VM) state, wherein the VM state includes a parent state and a snapshot;
    cloning the parent state and the snapshot to generate a cloned parent state file and a cloned snapshot file, respectively; and
    sending data indicating successful cloning of the parent state and the snapshot,
    wherein the hypervisor modifies a universally unique identifier of a configuration file for a configuration file for a configuration file for each of the cloned parent state file and the cloned snapshot file.

14. The non-transitory computer readable medium of claim 13, wherein the parent state includes an indication of a relationship to the snapshot.

15. The non-transitory computer readable medium of claim 13, the method further comprising:
    detecting, by the CVM, a second snapshot; and
    cloning, by the CVM, the second snapshot.

16. The non-transitory computer readable medium of claim 13, wherein each of the parent state and the snapshot include a configuration file and a data file.

17. The non-transitory computer readable medium of claim 13, wherein the hypervisor removes a first indication of a relationship between the snapshot and the cloned snapshot, and wherein the hypervisor generates a second indication of a relationship between the cloned parent state file and the cloned snapshot file.

18. The non-transitory computer readable medium of claim 13, wherein the hypervisor registers a cloned VM including the cloned parent state file and the cloned snapshot file.

19. The method of claim 1, wherein the cloned parent state file and the cloned snapshot file are separate files.

20. The non-transitory computer readable medium of claim 13, wherein the cloned parent state file and the cloned snapshot file are separate files.

\* \* \* \* \*